(12) United States Patent
Chen

(10) Patent No.: US 11,406,186 B2
(45) Date of Patent: Aug. 9, 2022

(54) REBOUND DEVICE FOR SLIDE RAILS

(71) Applicant: SLIDE MEI YAO INTERNATIONAL CO., LTD., New Taipei (TW)

(72) Inventor: Tsung-Yao Chen, New Taipei (TW)

(73) Assignee: Slide Mei Yao International Co., Ltd., New Taipei (TW)

(*) Notice: Subject to any disclaimer, the term of this patent is extended or adjusted under 35 U.S.C. 154(b) by 275 days.

(21) Appl. No.: 16/843,170

(22) Filed: Apr. 8, 2020

(65) Prior Publication Data

US 2020/0337456 A1 Oct. 29, 2020

(30) Foreign Application Priority Data

Apr. 25, 2019 (TW) ................................ 108114444

(51) Int. Cl.
*A47B 88/477* (2017.01)
*F16C 29/02* (2006.01)
*A47B 88/46* (2017.01)

(52) U.S. Cl.
CPC ............ *A47B 88/477* (2017.01); *A47B 88/46* (2017.01); *F16C 29/02* (2013.01)

(58) Field of Classification Search
CPC .............................. A47B 88/46; A47B 88/477
USPC .......................................... 312/334.8, 334.44
See application file for complete search history.

(56) References Cited

U.S. PATENT DOCUMENTS

| | | | | |
|---|---|---|---|---|
| 5,040,833 A | * | 8/1991 | Brunnert | A47B 88/463 |
| 8,393,693 B2 | * | 3/2013 | Juan | A47B 88/467 |
| | | | | 312/334.44 |
| 8,485,616 B2 | * | 7/2013 | Chen | A47B 88/493 |
| | | | | 312/333 |
| 8,939,525 B1 | * | 1/2015 | Chen | A47B 88/467 |
| | | | | 312/333 |
| 9,961,998 B2 | * | 5/2018 | Chen | A47B 88/46 |
| 2014/0312755 A1 | * | 10/2014 | Nuckolls | A47B 88/40 |
| | | | | 29/407.01 |
| 2015/0091424 A1 | * | 4/2015 | Nuckolls | A47B 88/463 |
| | | | | 312/319.1 |
| 2017/0086583 A1 | * | 3/2017 | Chen | F16C 29/10 |

* cited by examiner

*Primary Examiner* — James O Hansen
(74) *Attorney, Agent, or Firm* — Rosenberg, Klein & Lee

(57) ABSTRACT

A rebound device includes a motion guide mechanism, a force-creating mechanism and an accessing mechanism. The motion guide mechanism includes a latch groove unit, and a latch member removably engaging a positioning portion of the latch groove unit. The accessing mechanism includes an accessing member having an urging portion. When an external force is applied to disengage the latch pin portion from the positioning portion, the accessing member moves in response to the external force such that the urging portion pushes the latch member to move the latch pin portion away from a transition groove of the latch groove unit.

8 Claims, 15 Drawing Sheets

REBOUND DEVICE FOR SLIDE RAILS

CROSS-REFERENCE TO RELATED APPLICATION

This application claims priority of Taiwanese Invention Patent Application No. 108114444, filed on Apr. 25, 2019.

FIELD

The disclosure relates to a rebound device for slide rails, and more particularly to a rebound device with an accessing mechanism.

BACKGROUND

An article of furniture may include a housing and a drawer. The drawer is operable to be opened (i.e., being drawn out from the housing) or closed (i.e., being pushed into the housing) relative to the housing. Two conventional slide rail devices may be respectively provided at two opposite lateral sides of the drawer. Each of the conventional slide rail devices may include two or three interengaged rails that are movable relative to each other. The drawer has a front panel.

The conventional slide rail device functions in such a way that the drawer can be automatically opened by depressing the front panel thereof. U.S. Pat. No. 5,040,833 and Taiwanese Patent Application Publication No. 201242540 disclose some examples of such slide rail device.

SUMMARY

Therefore, an object of the disclosure is to provide a novel rebound device.

According to the disclosure, the rebound device is for use in a slide rail mechanism. The slide rail mechanism includes a fixed rail unit, and a movable rail unit that is movable along the fixed rail unit in an energy-storing direction and an energy-release direction different from the energy-storing direction. The rebound device includes a push mechanism, a motion guide mechanism, a force-creating mechanism and an accessing mechanism. The push mechanism includes a push member. The motion guide mechanism includes a latch member and a latch groove unit. The latch groove unit includes an energy-release groove, a positioning portion and a transition groove. The latch member has a latch pin portion. The latch pin portion engages the positioning portion when the movable rail unit is in an energy-stored state. The force-creating mechanism is able to store elastic energy for providing at least one restoring force that is oriented in the energy-release direction. The accessing mechanism includes an accessing member that has an urging portion. When the movable rail unit is moved in the energy-storing direction by an external force to be switched from the energy-stored state to another state, the latch pin portion is disengaged from the positioning portion, and the accessing member moves in response to the movement of the movable rail unit such that the urging portion of the accessing member pushes the latch member to move the latch pin portion away from the transition groove. Further movement of the movable rail unit in the energy-storing direction drives the latch pin portion to further move away from the transition groove by virtue of the accessing mechanism. When the external force is removed, the latch pin portion is moved into and along the energy-release groove.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
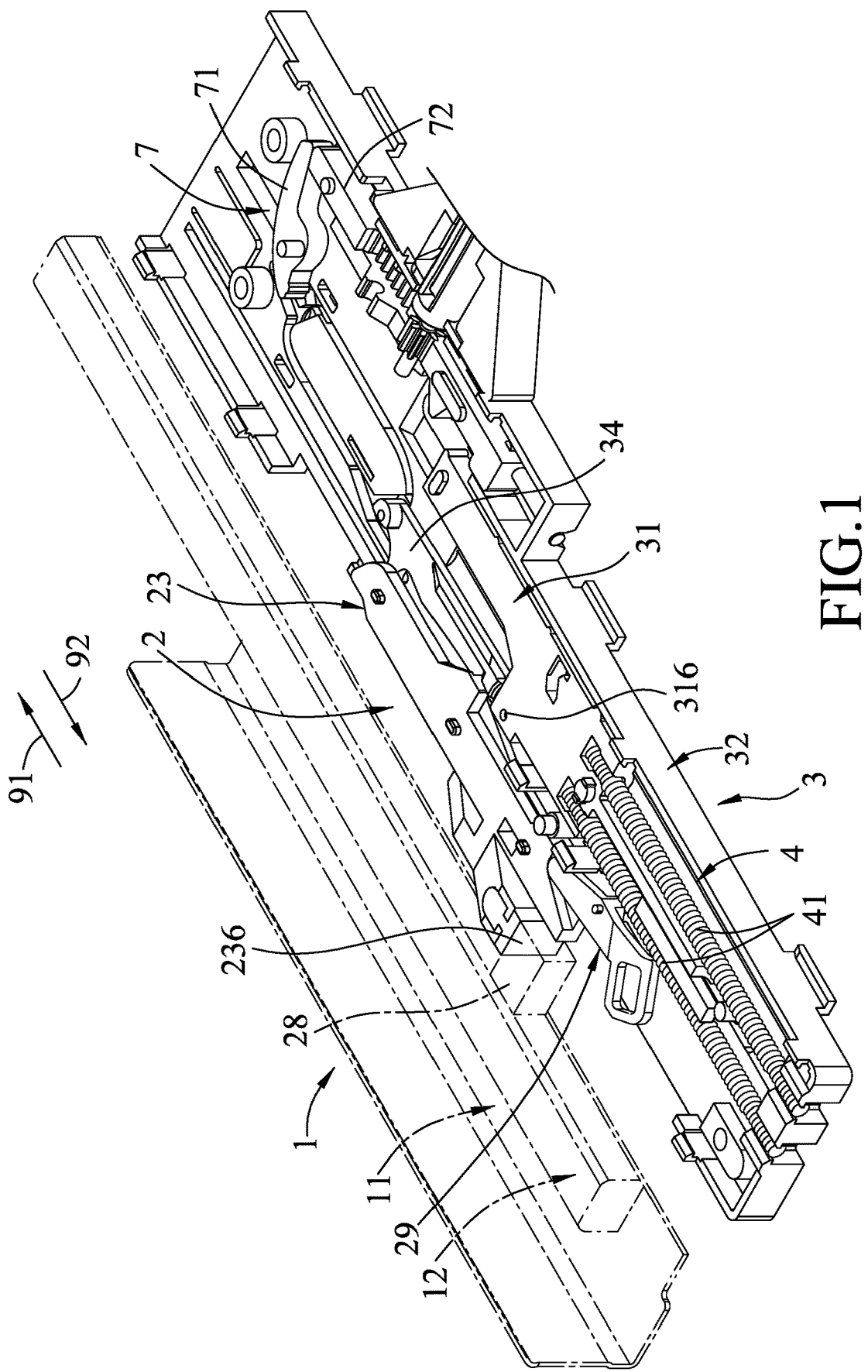
FIG. 1 is a perspective view illustrating an embodiment of the rebound device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
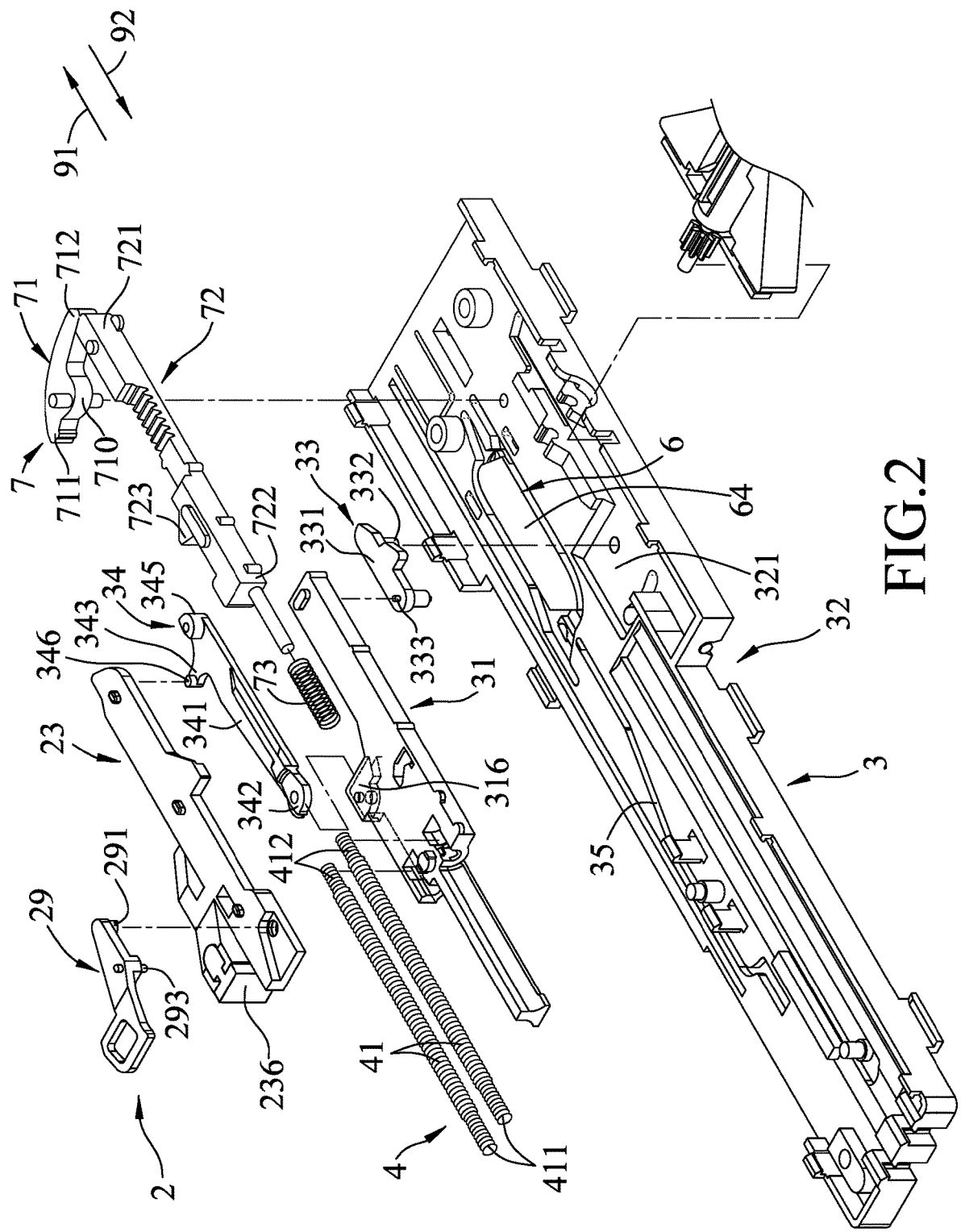
FIG. 2 is an exploded perspective view illustrating the embodiment.
Figure 3:
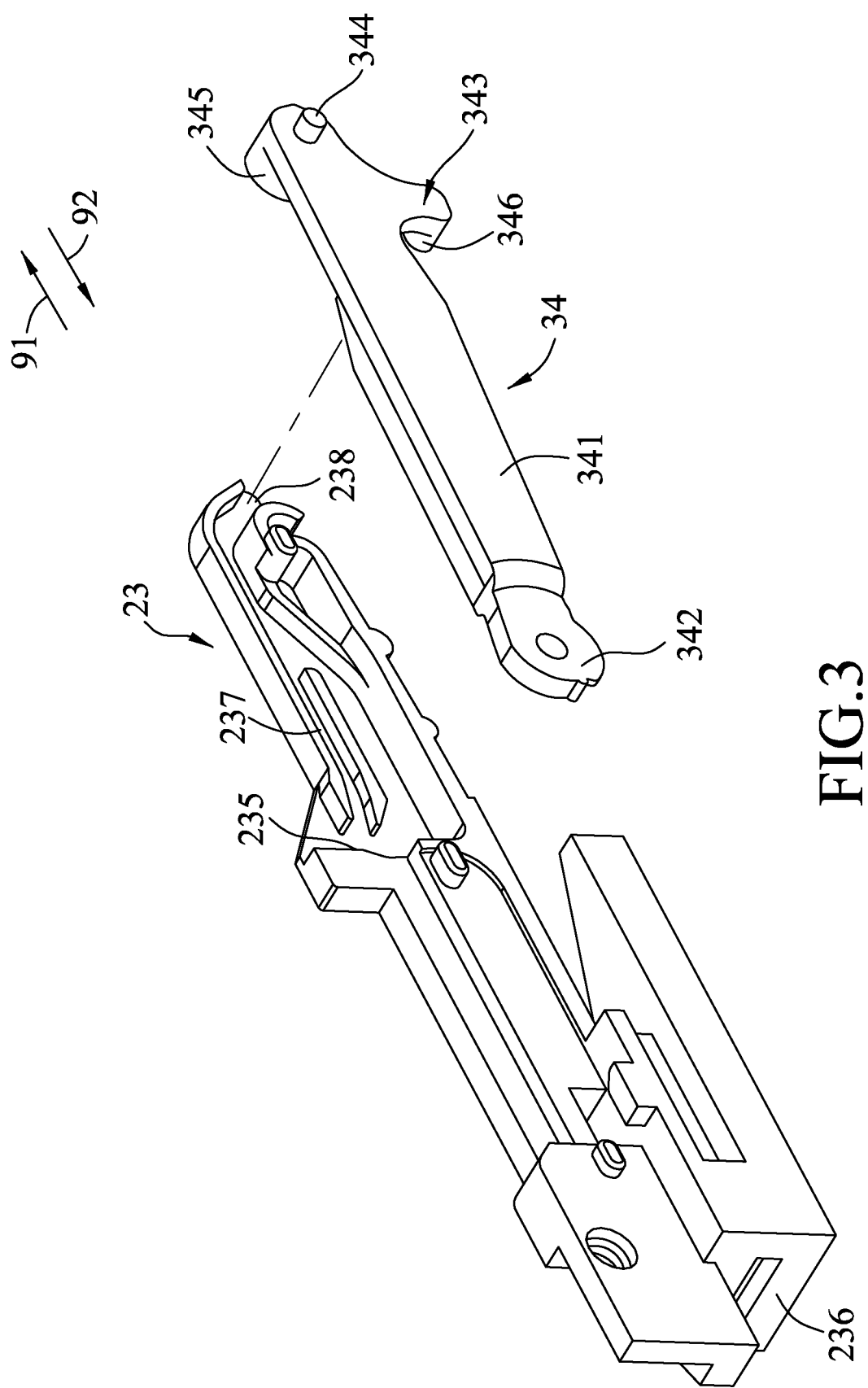
FIG. 3 is an exploded perspective view illustrating a push member and a driven member of the embodiment.

Referring to FIGS. 1 to 3, an embodiment of the rebound device according to the disclosure is for use in an article of furniture, such as a cabinet or a closet. The article of furniture includes a housing (not shown), a drawer (not shown) that is operable to be opened (i.e., being drawn out from the housing) or closed (i.e., being pushed into the housing) relative to the housing, and a slide rail mechanism 1. The slide rail mechanism 1 includes a fixed rail unit 11 that is fixedly connected to the housing, and a movable rail unit 12 that is co-movably connected to the drawer. The movable rail unit 12 is reciprocally movable along the fixed rail unit 11 in an energy-storing direction 91 and an energy-release direction 92 that is different from the energy-storing direction 91. In this embodiment, the energy-storing direction 91 is the direction in which the drawer is pushed into the housing, and is oriented toward a rear side of the housing. The energy-release direction 92 is parallel to and opposite to the energy-storing direction 91, is the direction in which the drawer is drawn out from the housing, and is oriented toward a front side of the housing. This embodiment is exemplified to be used in a drawer, but may be used in any article that is movable along a rail. The first embodiment of the rebound device includes a push mechanism 2, a motion guide mechanism 3, a force-creating mechanism 4 and an accessing mechanism 7.

The push mechanism 2 includes a push member 23, an urge unit 28 that is co-movably mounted to the movable rail unit 12, and an auxiliary push member 29 that is pivotally connected to the push member 23. With particular reference to FIG. 3, the push member 23 has a guide groove 237 that is formed in a bottom surface of the push member 23 and that has an entrance 238 at an end thereof, a push surface 235 that is located at another end of the guide groove 237 distal from the entrance 238, and an urge surface 236 that faces toward the energy-release direction 92. The urge unit 28 is connected to the drawer via the movable rail unit 12, and is for pushing the urge surface 236 of the push member 23 to move the push member 23 in the energy-storing direction 91. The auxiliary push member 29 has an auxiliary connecting portion 291 that is pivotally connected to the push member 23, and an auxiliary guide pin 293 that extends downwardly. The auxiliary push member 29 is movable along with the push member 23, and is pivotable relative to the push member 23.

Figure 4:
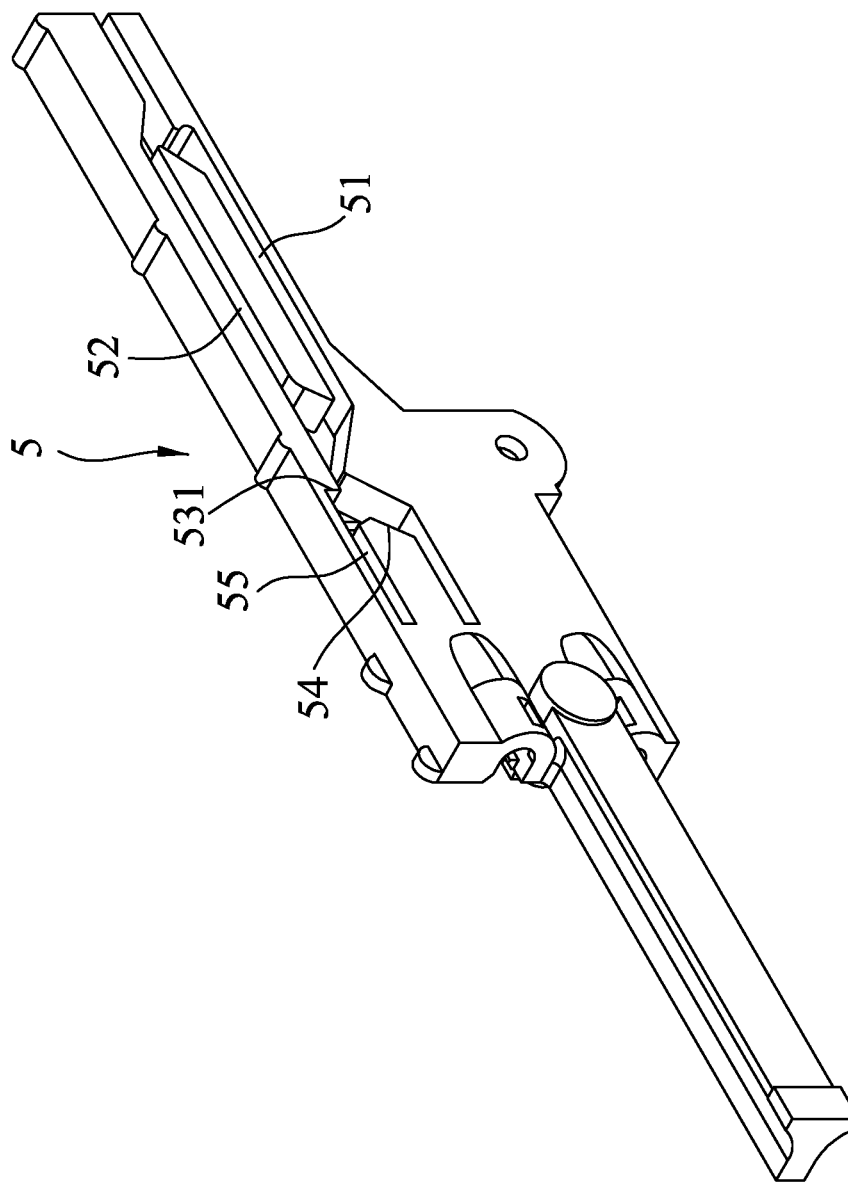
FIG. 4 is a perspective view illustrating a slide cover of the embodiment.

Referring to FIGS. 1, 2 and 4, the motion guide mechanism 3 includes a movable slide cover 31, a base seat 32 that is fixedly connected to the fixed rail unit 11, a latch member 33 that is pivotally connected to the base seat 32, and a driven member 34 that is pivotally connected to the slide cover 31. The slide cover 31 is slidably disposed on the base seat 32, and has a driven connecting portion 316, and a latch groove unit 5 that is formed in a bottom surface thereof. In one embodiment, the push member 23 is slidably mounted to the slide cover 31.

Referring to FIGS. 4 to 7, the latch groove unit includes an energy-storing groove 51, an energy-release groove 52, a positioning portion 531 that is disposed between the energy-storing groove 51 and the energy-release groove 52, a transition block 54 (see FIG. 7) that corresponds to the positioning portion 531 and that has an inclined surface, and a transition groove 55 that is located at one side of the transition block 54 and that is in spatial communication with the positioning portion 531.

Figure 5:
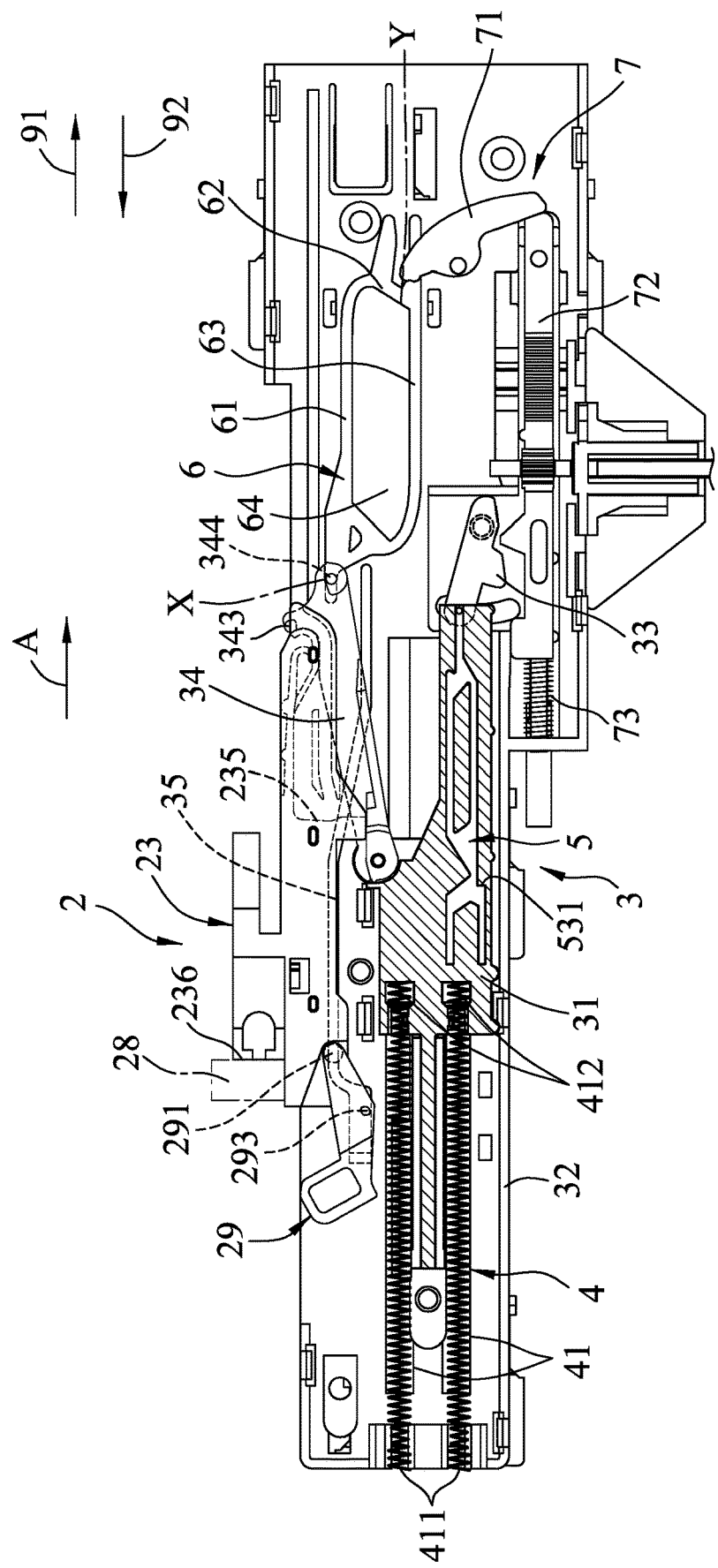
FIG. 5 is a sectional view illustrating the slide cover at an energy-storing initial position.
Figure 6:
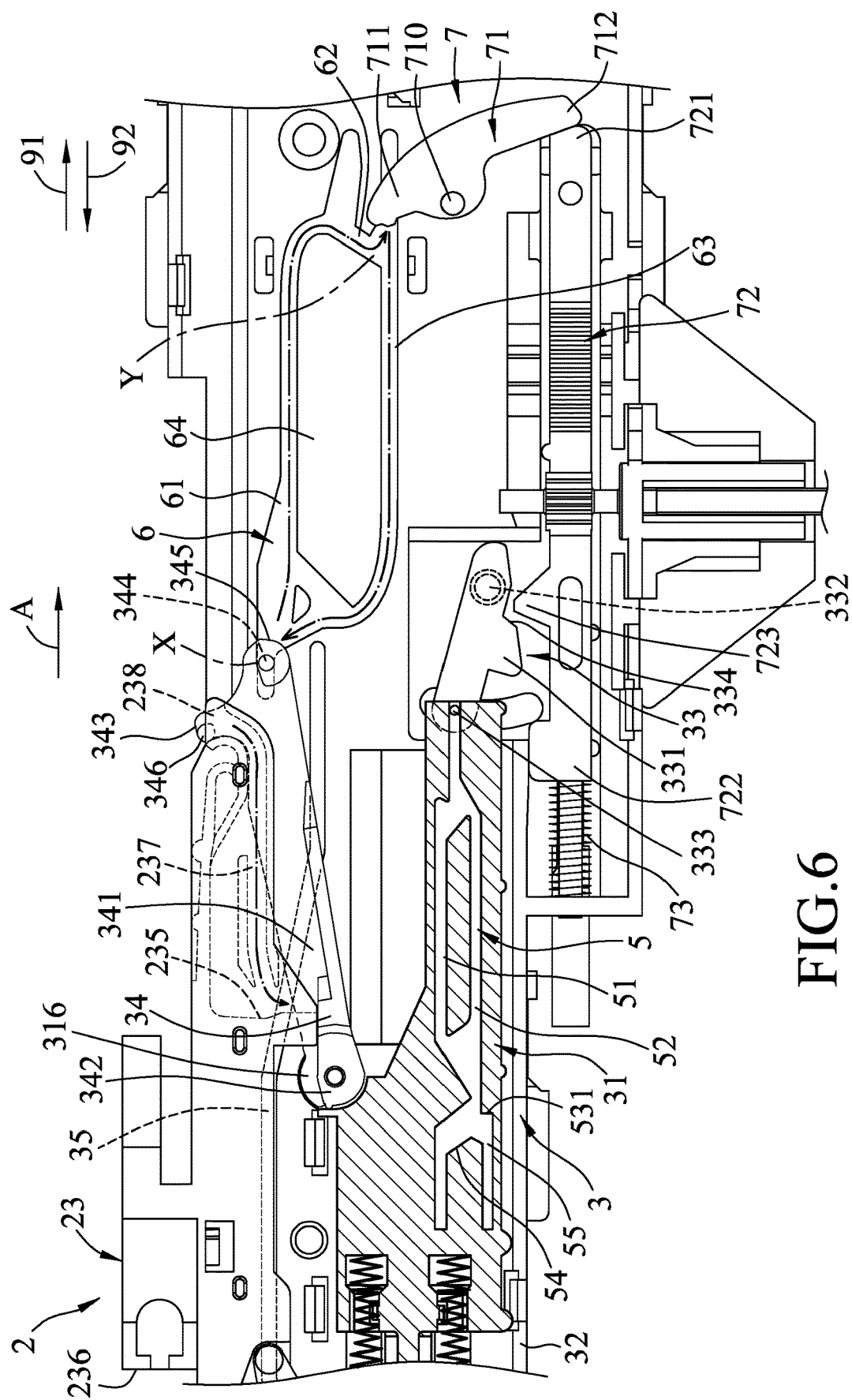
FIG. 6 is an fragmentary enlarged view of FIG. 5.

Referring to FIGS. 2, 5, 6 and 8, the base seat 32 has a bottom wall 321, a driven groove unit 6 that is formed in a top surface of the bottom wall 321, and an auxiliary groove 35 that is formed in the top surface of the bottom wall 321. The driven groove unit 6 includes an energy-storing groove 61 that extends in the energy-storing direction 91, a bent groove 62 that is located at an end of the energy-storing groove 61, an energy-release groove 63, and a block member 64 that is surrounded by the energy-storing groove 61, the bent groove 62 and the energy-release groove 63. The energy-release groove 63 has a first portion that extends from the bent groove 62 in the energy-release direction 92, and a second portion that is bent from the first portion and that extends to the other end of the energy-storing groove 61 distal from the bent groove 62. With particular reference to FIGS. 5 and 6, the driven groove unit 6 defines an energy-storing initial point (X) at an end of the energy-storing groove 61, and an energy-storing end point (Y) at the bent groove 62.

The auxiliary groove 35 permits the auxiliary guide pin 293 of the auxiliary push member 29 to move therealong, so as to guide pivotal movement of the auxiliary push member 29 relative to the push member 23.

Figure 7:
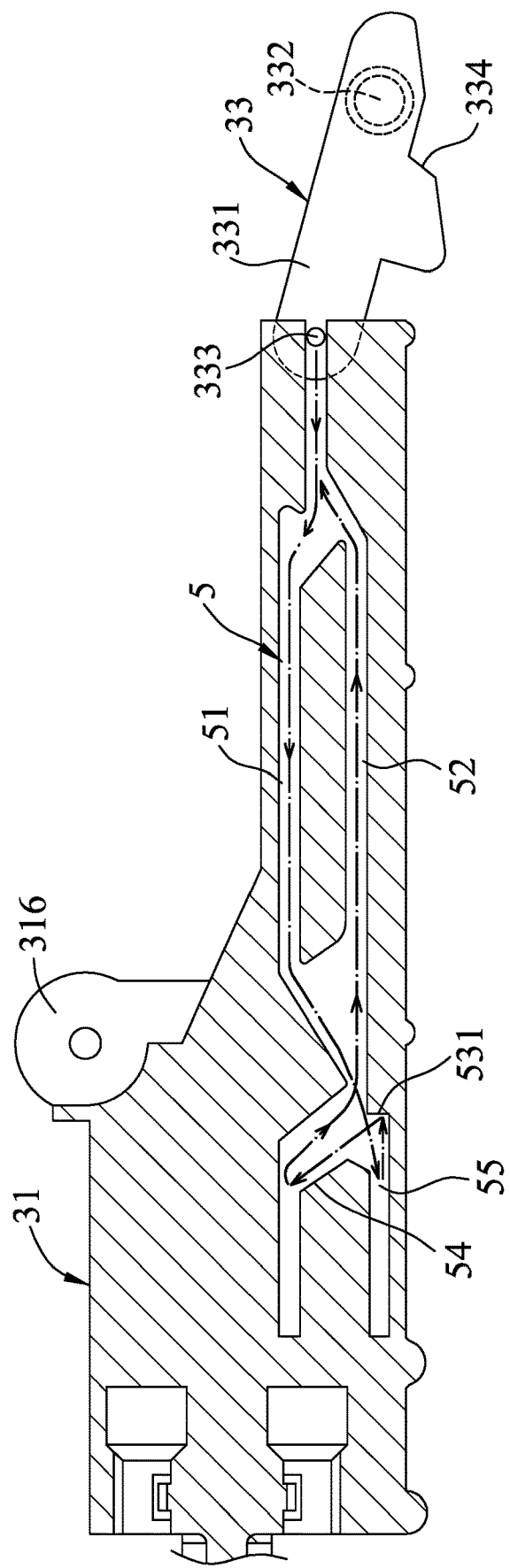
FIG. 7 is a fragmentary sectional view illustrating a latch groove unit formed in the slide cover.

Referring to FIGS. 2, 6 and 7, the latch member 33 is pivotally mounted to the base seat 32, and has a latch body 331 that is located above the base seat 32 and that is formed with a pushed surface 334 (see FIGS. 6 and 7), a latch pivoted portion 332 that protrudes from a bottom surface of the latch body 331 and that is pivotally connected to the base seat 32, and a latch pin portion 333 that protrudes upwardly from the latch body 331 and that is movable within the latch groove unit 5.

Referring to FIGS. 2, 3, 5 and 6, the driven member 34 is pivotally mounted to the slide cover 31, and has a driven body 341 that is located below the slide cover 31, a driven pivoted portion 342 that protrudes from the driven body 341 and that is pivotally connected to the driven connecting portion 316 of the slide cover 31, a driven projection 343 that projects from the driven body 341 and that is located on the path of movement of the push member 23, a first driven pin portion 344 that protrudes downwardly from the driven body 341, and a pushing portion 345 that is adjacent to the first driven pin portion 344. The driven projection 343 has a second driven pin portion 346 that protrudes upwardly and that is movable within the guide groove 237 of the push member 23. The first driven pin portion 344 is movable along the energy-storing groove 61, the bent groove 62 and the energy-release groove 63 of the driven groove unit 6. The driven member 34 of this embodiment pivots relative to the slide cover 31 about the driven connecting portion 316.

Referring to FIGS. 1 and 2, the force-creating mechanism 4 interconnects the base seat 32 and the slide cover 31, and is able to store elastic energy for providing at least one restoring force that is oriented in the energy-release direction 92. In this embodiment, the force-creating mechanism 4 is operable to provide a first-stage restoring force and a second-stage restoring force that are sequentially applied on the slide cover 31 and that are oriented in the energy-release direction 92. The force-creating mechanism 4 includes a plurality of springs 41. Each of the springs 41 is configured as an extension spring, extends in the energy-storing direction 91, and has a first end 411 that is connected to the base seat 32, and a second end 412 that is connected to the slide cover 31.

The accessing mechanism 7 includes a transmission member 71, an accessing member 72 and an accessing resilient member 73. The transmission member 71 is pivotally mounted to the base seat 32, and has a first pivoted portion 710 that is pivoted to the base seat 32, a pushed portion 711 and a pushing portion 712 that are respectively located at two opposite sides of the first pivoted portion 710. The accessing member 72 is elongated, extends in the energy-storing direction 91, and has a first end portion 721 that is proximate to the pushing portion 712 of the transmission member 71, a second end portion 722 that is opposite to the first end portion 721, and an urging portion 723 that is located between the first end portion 721 and the second end portion 722 and that protrudes toward the latch member 33. The urging portion 723 of the accessing member 72 is for pushing the pushed surface 334 of the latch member 33. The accessing resilient member 73 is disposed between a wall section of the base seat 32 and the second end portion 722 of the accessing member 72, and resiliently biases the accessing member 72 in the energy-storing direction 91.

Figure 11:
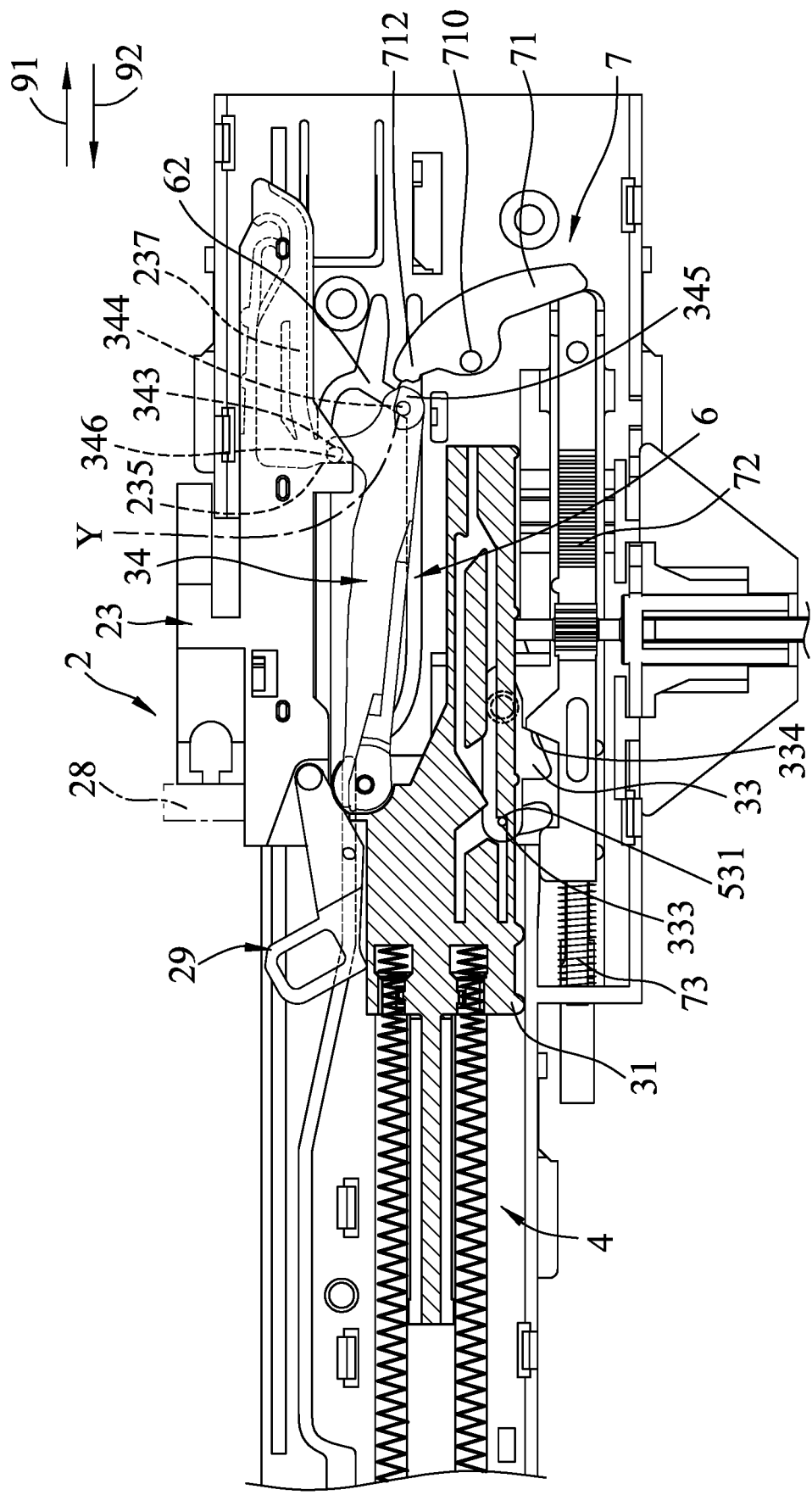
FIG. 11 is a fragmentary sectional view illustrating the slide cover at energy-stored position.

In use, the drawer, the movable rail unit 12 (see FIG. 1) and the push mechanism 2 are operable to switch between an energy-storing initial state (see FIGS. 5, 6 and 7), and an energy-stored state (see FIG. 11). Referring to FIGS. 5, 6 and 7, in the energy-storing initial state, the drawer is opened, the slide cover 31 is at an energy-storing initial position, the latch pin portion 333 of the latch member 33 is at an energy-storing initial point of the energy-storing groove 51 of the latch groove unit 5, the first driven pin portion 344 of the driven member 34 is at the energy-storing initial point (X) of the driven groove unit 6, and the second driven pin portion 346 of the driven member 34 is at the entrance 238 of the guide groove 237 of the push member 23.

Figure 8:
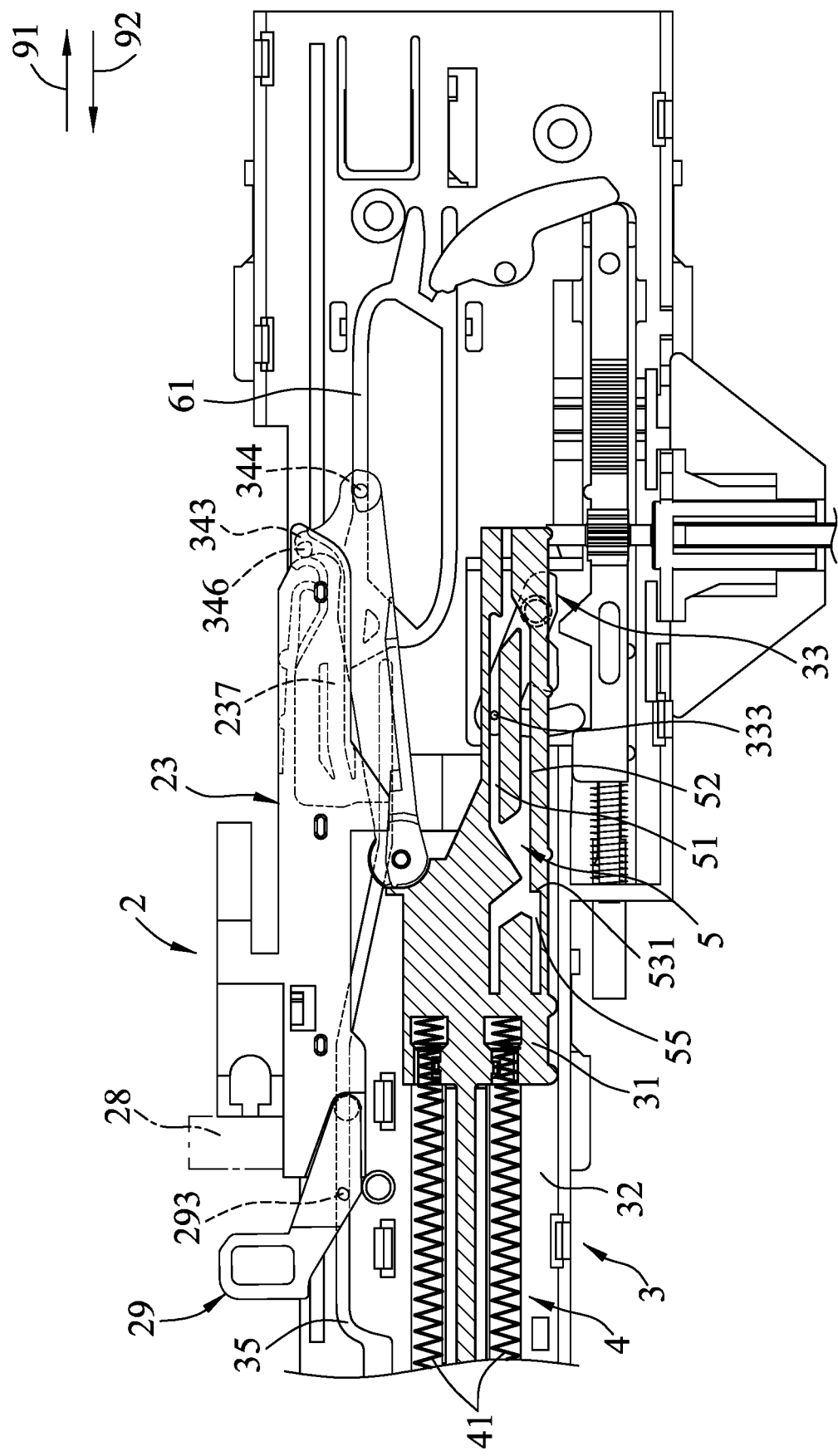
FIGS. 8 to 10 are fragmentary sectional views illustrating the slide cover being moved in a energy-storing direction.
Figure 9:
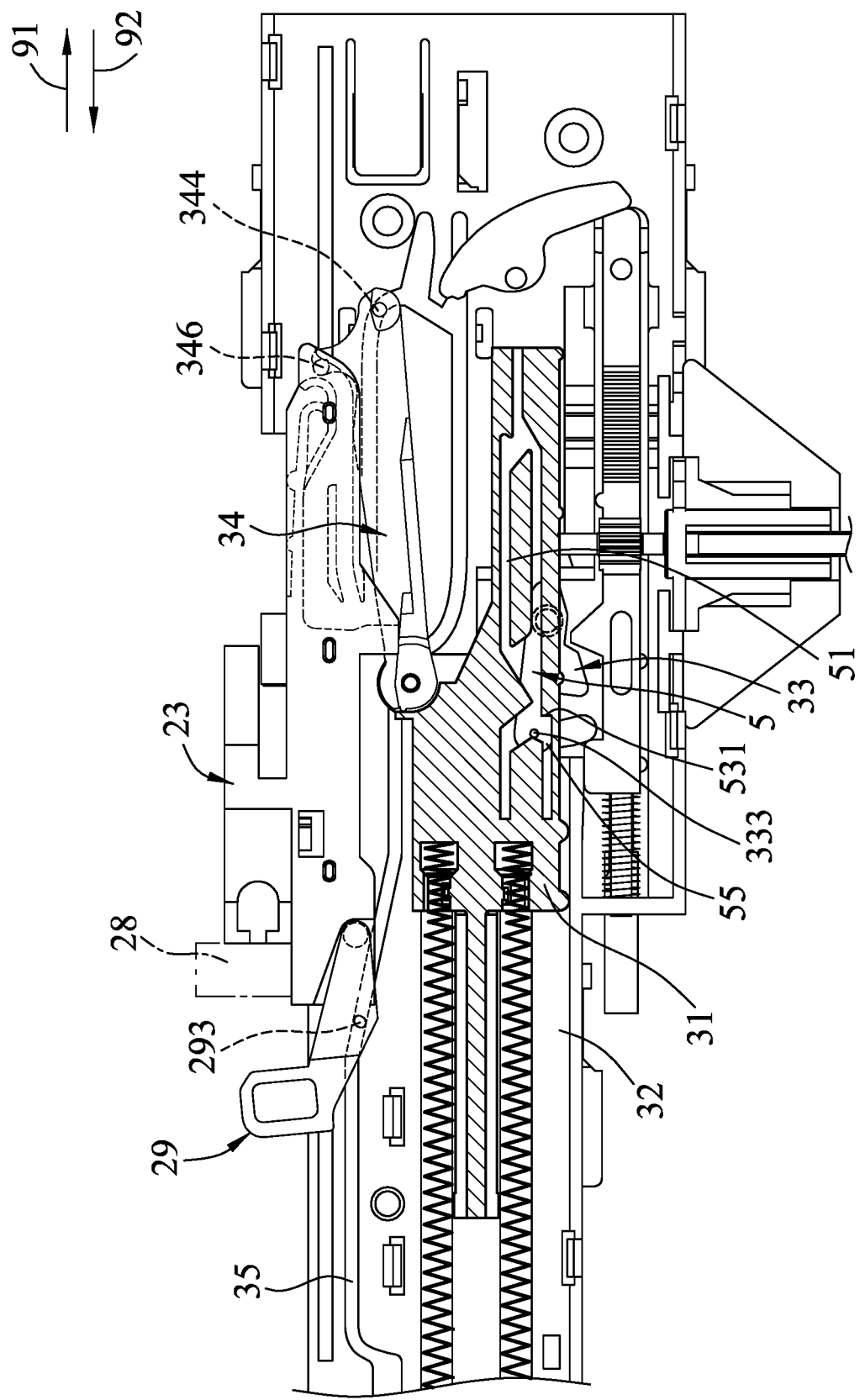

Referring to FIGS. 5, 8 and 9, to close the drawer, the drawer is pushed in the energy-storing direction 91 (as shown by the arrow (A) in FIG. 5) so that the movable rail unit 12 (see FIG. 2) and the urge unit 28 are moved in the energy-storing direction 91. The urge unit 28 pushes and moves the push member 23 in the energy-storing direction 91, so that the second driven pin portion 346 of the driven member 34 enters the entrance 238 of the guide groove 237 of the push member 23, and that the push member 23 pushes the driven projection 343 of the driven member 34 to move the driven member 34 in the energy-storing direction 91. The first driven pin portion 344 of the driven member 34 moves along the energy-storing groove 61 of the driven groove unit 6 and moves relative to the latch pin portion 333 of the latch member 33. Since the driven pivoted portion 342 of the driven member 34 is pivotally connected to the driven connecting portion 316 of the slide cover 31, the movement of the driven member 34 in the energy-storing direction 91 drives movement of the slide cover 31 in the energy-storing direction 91. The springs 41 of the force-creating mechanism 4 are stretched to store elastic energy.

Since the latch member 33 is pivotally connected to the base seat 32 and since the latch pin portion 333 of the latch member 33 moves in the energy-storing groove 51 of the latch groove unit 5, during the movement of the slide cover 31 relative to the base seat 32 in the energy-storing direction 91, the latch pin portion 333 of the latch member 33 gradually approaches the transition groove 55 from an end of the energy-storing groove 51 distal from the transition groove 55 (i.e., the energy-storing initial point). In FIGS. 8 and 9, the latch pin portion 333 is in contact with the transition block 54.

Figure 10:
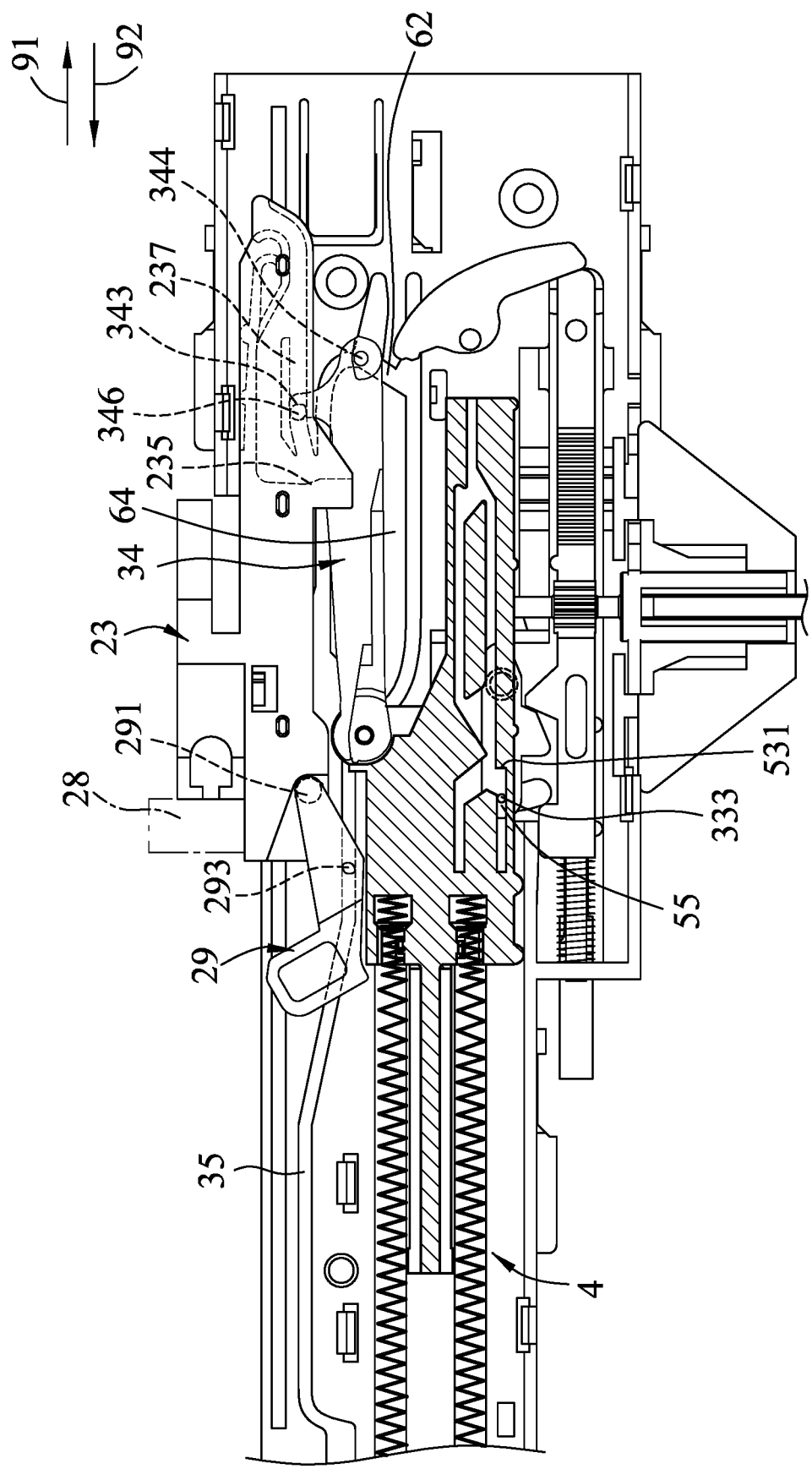

Referring to FIG. 10, the latch pin portion 333 of the latch member 33 then moves past the transition block 54 and enters the transition groove 55. The force-creating mechanism 4 is configured to generate the first-stage restoring force after the abovementioned operation. In addition, the movement of the push member 23 also drives movement of the auxiliary push member 29. In the state shown in FIG. 10, the movement of the second driven pin portion 346 of the driven member 34 transverse to the energy-storing direction 91 is limited by the guide groove 237 of the push member 23, so the first driven pin portion 344 of the driven member 34 is temporarily positioned relative to the bent groove 62. In the state shown in FIG. 10, the push member 23 is continuously driven by the urge unit 28 to move in the energy-storing direction 91. Since the first driven pin portion 344 of the driven member 34 is temporarily positioned relative to the bent groove 62, the abovementioned movement of the push member 23 in the energy-storing direction 91 does not drive movement of the driven member 34. In one embodiment, the movement of the push member 23 in the energy-storing direction 91 may be buffered by a ratchet mechanism so that the drawer can be prevented from being closed fiercely.

Referring to FIGS. 10 and 11, when the push surface 235 of the push member 23 is in contact with the driven projection 343 of the driven member 34, the first driven pin portion 344 of the driven member 34 is permitted to move within the bent groove 62 of the driven groove unit 6, the first-stage restoring force generated by the force-creating mechanism 4 immediately moves the slide cover 31 relative to the latch member 33 in the energy-release direction 92, so that the latch pin portion 333 of the latch member 33 engages the positioning portion 531 and that the first driven pin portion 344 of the driven member 34 moves along the bent groove 62 to rotate the driven member 34 relative to the slide cover 31. The slide cover 31 is at an energy-stored position after the abovementioned operation (FIG. 11). At this time, the movable rail unit 12 is in the energy-stored state, and the first driven pin portion 344 of the driven member 34 is at the energy-storing end point (Y). The distance of the abovementioned movement of the slide cover 31, in which the slider cover 31 moves the latch pin portion 333 of the latch member 33 relative to the slide cover 31 from the transition groove 55 to the positioning portion 531, is about a few millimeters.

The rebound device according to the disclosure provides two manners in which the drawer is opened. The first one is to directly draw the drawer forwardly in the energy-release direction 92, and the second one is to depress the drawer rearwardly in the energy-storing direction 91 so that the drawer can be opened by the restoring force generated by the springs 41 of the force-creating mechanism 4.

To open the drawer in the first manner, an external force is applied to move the drawer forwardly in the energy-release direction 92, so that the movable rail unit 12 (see FIG. 1) and the urge unit 28 are moved in the energy-release direction 92. Since the auxiliary push member 29 is removed from the path of movement of the urge unit 28, during such opening operation, the urge unit 28 freely moves in the energy-release direction 92 without forcibly passing any component until the drawer is fully opened, the slide cover 31 is maintained at the energy-stored position, the push member 23 is not moved, and the latch pin portion 333 of the latch member 33 continues engaging the positioning portion 531 of the latch groove unit 5. To close the drawer again, the drawer is pushed to move in the energy-storing direction 91 while the slide cover 31 is maintained at the energy-stored position.

Figure 12:
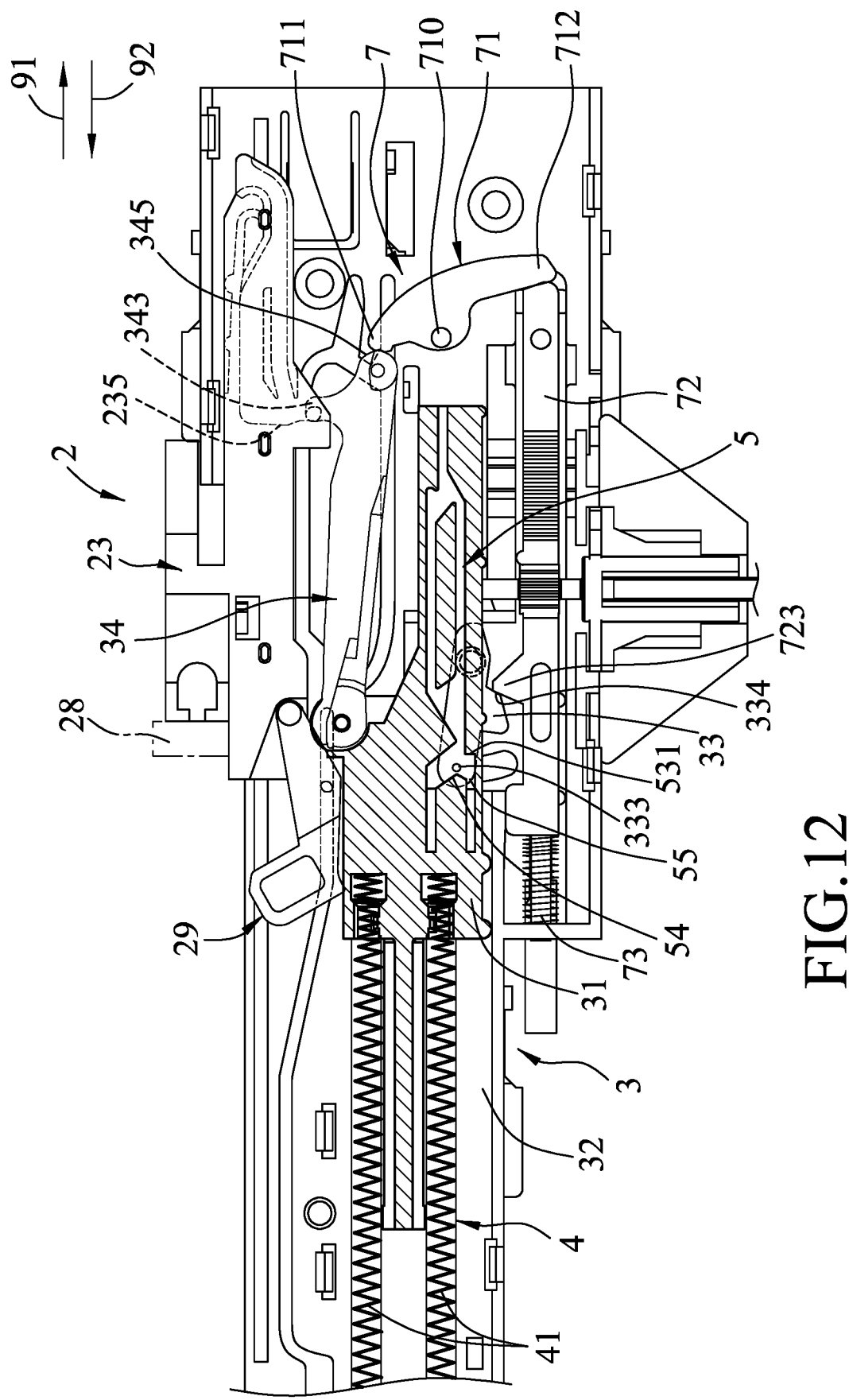
FIG. 12 is a fragmentary sectional view illustrating an urge unit of the embodiment being depressed in the energy-storing direction.

Referring to FIGS. 11 and 12, to open the drawer in the second manner, an external force is applied to depress the drawer rearwardly in the energy-storing direction 91, so that the urge unit 28 pushes and moves the push member 23 in the energy-storing direction 91. The push surface 235 of the push member 23 therefore pushes the second driven pin portion 346 of the driven member 34 to move the driven member 34 and the slide cover 31 in the energy-storing direction 91, so that the latch pin portion 333 of the latch member 33 is disengaged from the positioning portion 531, and that the slide cover 31 moves away from the energy-stored position. Along with the movement of the driven member 34 in the energy-storing direction 91, the pushing portion 345 of the driven member 34 moves in the energy-storing direction 91 to push the pushed portion 711 of the transmission member 71 so as to rotate the transmission member 71 clockwise, and then the pushing portion 712 of the transmission member 71 pushes the first end portion 721 of the accessing member 72 to move the accessing member 72 in the energy-release direction against the biasing action of the accessing resilient member 73, so that the urging portion 723 of the accessing member 72 pushes the pushed surface 334 of the latch member 33 to rotate the latch member 33 clockwise. As such, the latch pin portion 333 of the latch member 33 moves toward the transition block 54 rather than toward the transition groove 55 that is aligned with the positioning portion 531 (i.e., the latch pin portion 333 is moved away from the transition groove 55). The springs 41 of the force-creating mechanism 4 is further stretched to generate the second-stage restoring force after the abovementioned operation.

Figure 13:
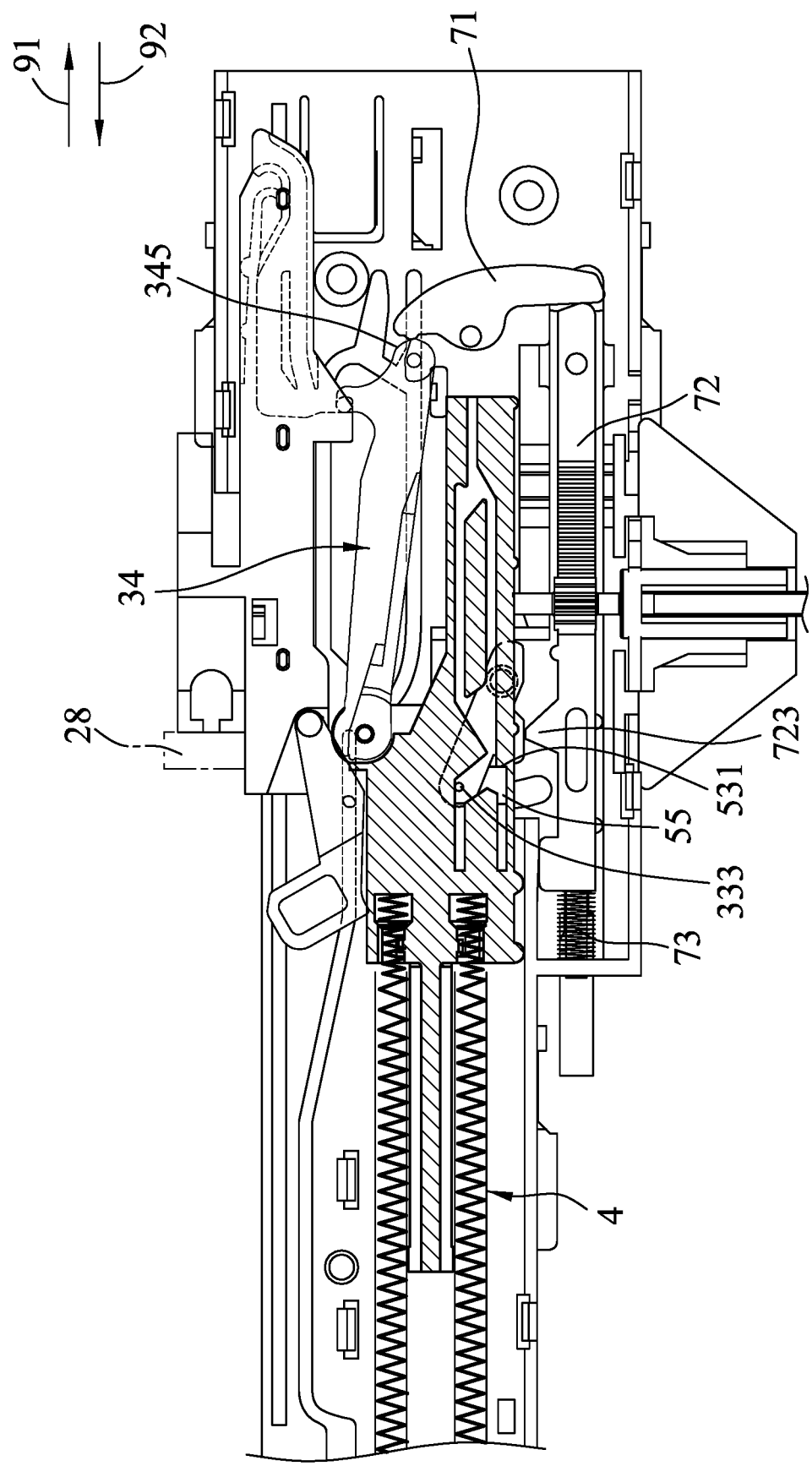
FIG. 13 is a fragmentary sectional view illustrating the urge unit of the embodiment being further depressed in the energy-storing direction.

Referring further to FIG. 13, in one embodiment, the rebound device is configured such that further movement of the driven member 34 in the energy-storing direction 91 (also further movement of the movable rail unit 12 in the energy-storing direction 91) drives the latch pin portion 333 to further move away from the transition groove 55 by virtue of the accessing mechanism 7. In FIG. 12, a distance between the latch pin portion 333 and the positioning portion 531 is 1.5 millimeters. In FIG. 13, the distance between the latch pin portion 333 and the positioning portion 531 is 5 millimeters.

Figure 14:
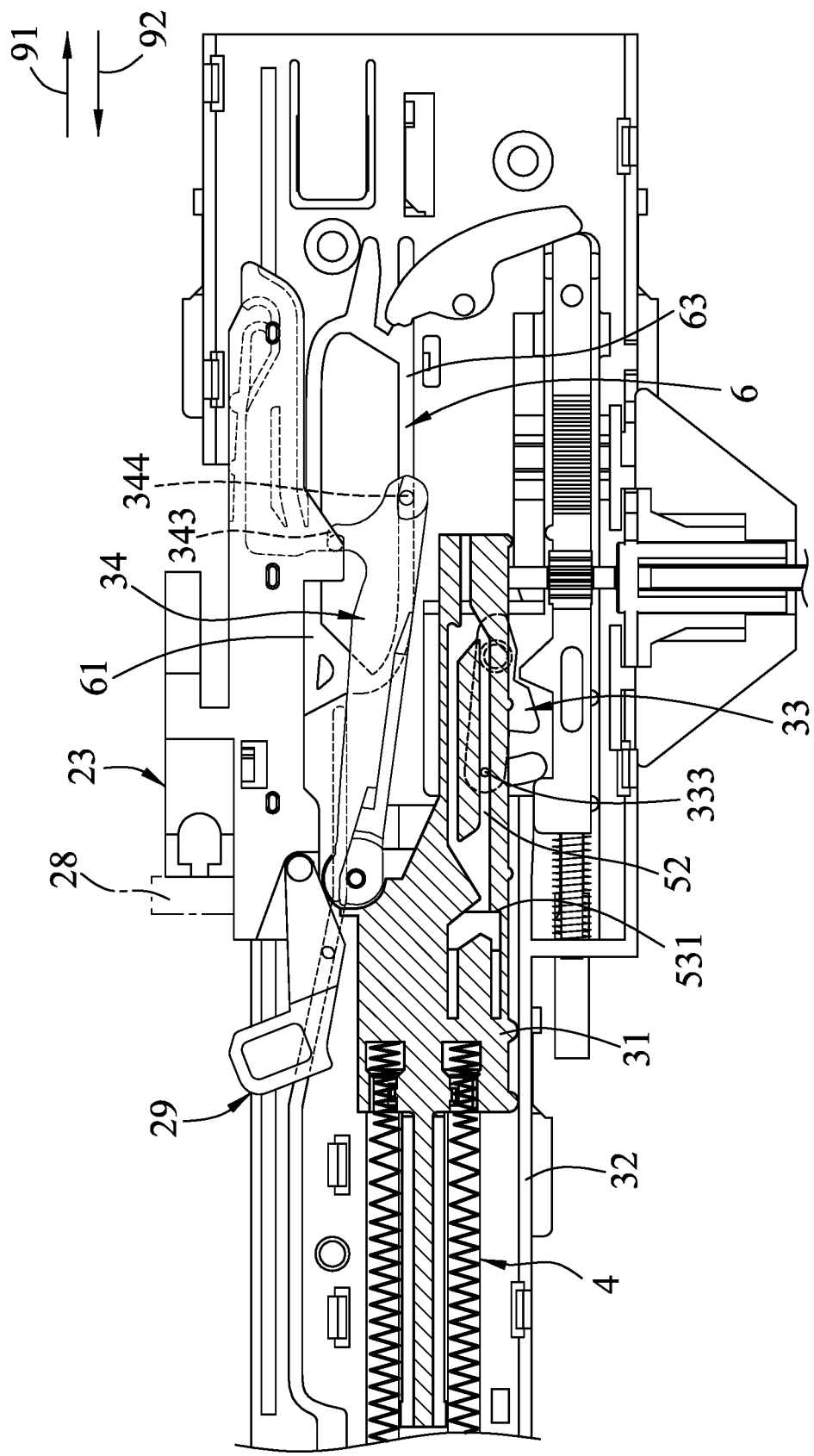
FIGS. 14 and 15 are fragmentary sectional views illustrating the slide cover being moved back to the energy-storing initial position.
Figure 15:
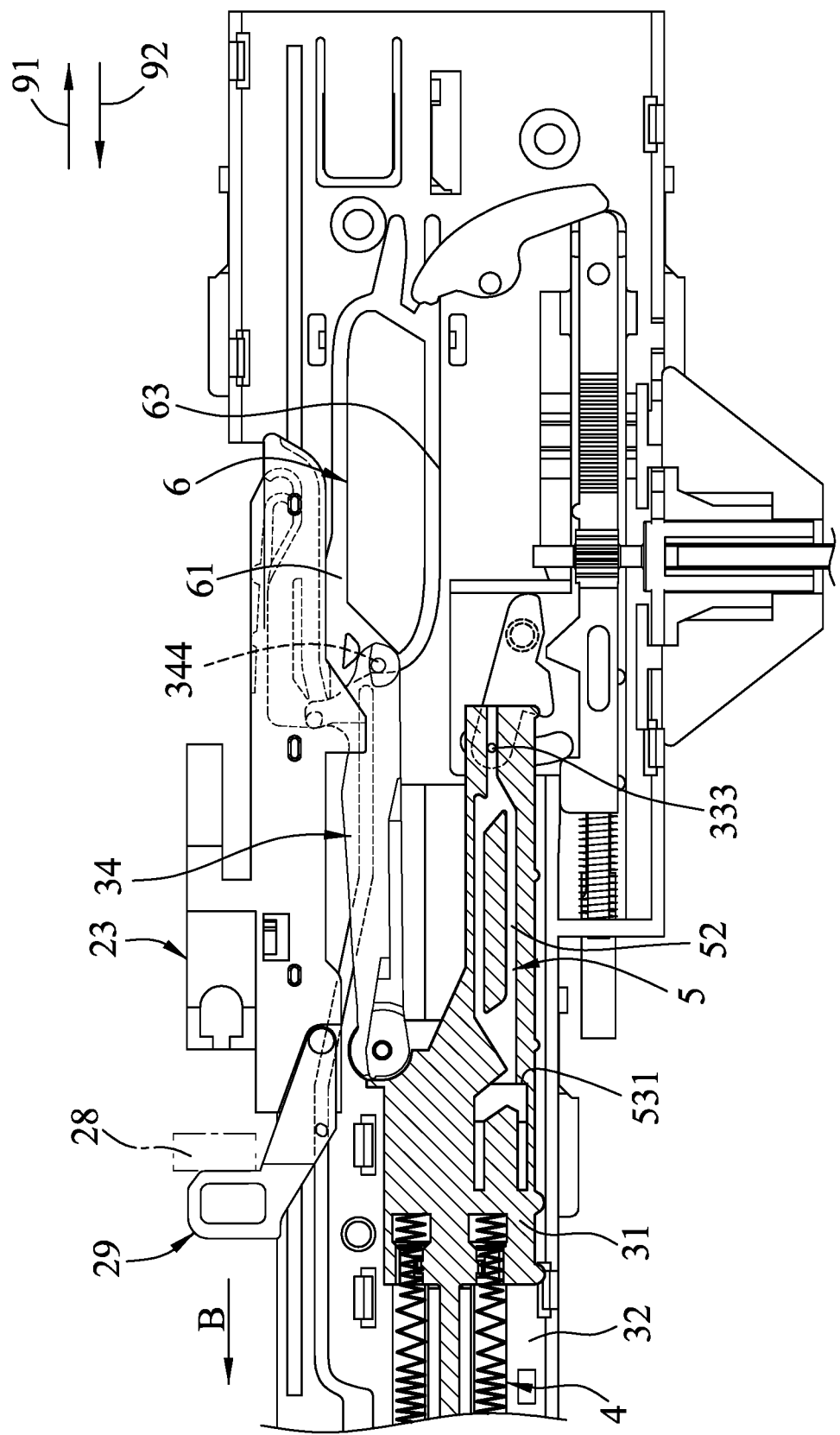

Referring to FIGS. 14 and 15, when the external force in the energy-storing direction 91 is removed, the second-stage restoring force generated by the force-creating mechanism 4 draws the slide cover 31 to move in the energy-release direction 92 so that the latch pin portion 333 of the latch member 33 moves along the energy-release groove 52 of the latch groove unit to the energy-storing initial point of the energy-storing groove 51 shown in FIG. 5. During the movement of the slide cover 31 back to the energy-storing initial position shown in FIG. 5, the driven projection 343 of the driven member 34 pushes the push surface 235 of the push member 23 so that the push member 23 pushes and moves the urge unit 28 in the energy-release direction 92, and the first driven pin portion 344 of the driven member 34 moves back to the energy-storing initial point (X) at the energy-storing groove 61 of the driven groove unit 6 via the energy-release groove 63.

Specifically, in the state shown in FIG. 15, the auxiliary push member 29 moves back onto the path of movement of the urge unit 28. The urge unit 28 has the tendency to move in the energy-release direction 92 (as shown by the arrow (B) in FIG. 15), so as to hit and move the auxiliary push member 29 in the energy-release direction 92. The auxiliary push member 29 drives the push member 23 to move in the energy-release direction 92, and the second driven pin portion 346 of the driven member 34 is guided by the guide groove 237 (see FIG. 4) of the push member 23 to rotate the driven member 34 such that the first driven pin portion 344 of the driven member 34 moves from the energy-release groove 63 into the energy-storing groove 61. As such, the slide cover 31 is moved by the force-creating mechanism 4 again back to the energy-storing initial position, the latch pin portion 333 of the latch member 33 moves back to the energy-storing initial point of the energy-storing groove 51 of the latch groove unit 5, the first driven pin portion 344 of the driven member 34 moves back to the energy-storing initial point (X) of the driven groove unit 6, and the auxiliary push member 29 is retracted into the slide cover 31, as shown in FIG. 5. The urge unit 28 can therefore freely move past the auxiliary push member 29 for fully opening the drawer. After the pushing portion 345 of the driven member 34 is separated from the pushed portion 711 of the transmission member 71, the accessing member 72 is biased by the accessing resilient member 73 to move to its original position (see FIGS. 5 and 6). The following closing operation of the drawer is the same as the above. In one embodiment, the movement of the slide cover 31 in the energy-release direction 92 may be buffered by a ratchet mechanism.

In summary, when the movable rail unit 12 is in the energy-stored state (see FIG. 11), the latch pin portion 333 engages the positioning portion 531. When the movable rail unit 12 is moved in the energy-storing direction 91 by an external force to be switched from the energy-stored state back to the energy-storing initial state (see FIGS. 5, 6 and 7), the latch pin portion 333 is disengaged from the positioning portion 531, and the accessing member 72 moves away from an original position in response to the movement of the movable rail unit 12 such that the urging portion 723 of the accessing member 72 pushes the latch member 33 to move the latch pin portion 333 away from the transition groove 55. Further movement of the movable rail unit 12 in the energy-storing direction 91 drives the latch pin portion 333 to further move away from the transition groove 55 by virtue of the accessing mechanism 7. When the external force is removed, the restoring force generated by the force-creating mechanism 4 drives the latch pin portion 333 to move along the energy-release groove 52 to the energy-storing initial point of the energy-storing groove 51 (see FIGS. 5, 6 and 7), and cooperates with the auxiliary push member 29 to drive the first driven pin portion 344 to move to the energy-storing initial point (X) of the driven groove unit 6, and the accessing member 72 moves back to the original position.

If the accessing mechanism 7 is omitted, when the drawer is depressed for being opened, the latch pin portion 333 of the latch member 33 is configured to move into the transition groove 55. After the external force is removed, the latch pin portion 333 moves to re-engage the positioning portion 531.

It should be noted that, the concept in this disclosure is to store energy by relative movement between two objects, and to drive relative movement between two objects by releasing the stored energy. In practice, either of the two objects need not be limited to be fixed, and the two objects are not limited to move toward each other or move away from each other.

It should be noted that, in this embodiment, the positioning portion 531 of the latch groove unit 5 is configured to be aligned with the transition groove 55 in the energy-release direction 92. In a modification, the positioning portion 531 may have other configuration.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A rebound device adapted for use in a slide rail mechanism, the slide rail mechanism including a fixed rail unit, and a movable rail unit that is movable along the fixed rail unit in an energy-storing direction and an energy-release direction different from the energy-storing direction, said rebound device comprising:

a push mechanism including a push member;

a motion guide mechanism including a latch member and a latch groove unit, said latch groove unit including an energy-release groove, a positioning portion and a transition groove, said latch member having a latch pin portion, said latch pin portion engaging said positioning portion when the movable rail unit is in an energy-stored state;

a force-creating mechanism able to store elastic energy for providing at least one restoring force that is oriented in the energy-release direction; and an accessing mechanism including an accessing member that has an urging portion;

wherein, when the movable rail unit is moved in the energy-storing direction by an external force to be switched from the energy-stored state to another state, said latch pin portion is disengaged from said positioning portion, and said accessing member moves in response to the movement of the movable rail unit such that said urging portion of said accessing member pushes said latch member to move said latch pin portion away from said transition groove, further movement of the movable rail unit in the energy-storing direction driving said latch pin portion to further move away from said transition groove by virtue of said accessing mechanism; and wherein, when the external force is removed, said latch pin portion is moved into and along said energy-release groove.

2. The rebound device as claimed in claim 1, wherein said latch member further has a pushed surface that is for being pushed by said urging portion of said accessing member.

3. The rebound device as claimed in claim 2, wherein said accessing mechanism further includes a transmission member that is pivotably mounted to said motion guide mechanism, said transmission member having a pushing portion, said accessing member further having a first end portion that is for being pushed by said pushing portion of said transmission member.

4. The rebound device as claimed in claim 3, wherein said transmission member further has a first pivoted portion that is pivoted to said motion guide mechanism, and a pushed portion, said pushed portion and said pushing portion being respectively located at two opposite sides of said first pivoted portion, said accessing mechanism further including a accessing resilient member that resiliently biases said accessing member in the energy-storing direction.

5. The rebound device as claimed in claim 4, wherein said motion guide mechanism further includes a driven member and a driven groove unit, said driven member having a first driven pin portion that is movable within said driven groove unit, and a pushing portion that is for pushing said pushed portion of said transmission member.

6. The rebound device as claimed in claim 1, wherein said latch groove unit further includes a energy-storing groove.

7. The rebound device as claimed in claim 6, wherein said motion guide mechanism further includes a first driven pin portion, said push mechanism further including an auxiliary push member, when the external force that is applied to switch the movable rail unit from the energy-stored state to another state is removed, the restoring force generated by said force-creating mechanism driving said latch pin portion to move along said energy-release groove, and cooperating with said auxiliary push member to drive said first driven pin portion to move to an energy-storing initial point of said driven groove unit.

8. The rebound device as claimed in claim 1, wherein said motion guide mechanism further includes a slide cover in which said positioning portion is provided, said slide cover being associated with said force-creating mechanism.

\* \* \* \* \*